United States Patent
Gernot et al.

(10) Patent No.: US 10,739,472 B2
(45) Date of Patent: Aug. 11, 2020

(54) POSITIONING SYSTEM WITH MEANS OF GENERATING GNSS SIGNALS AND RADIATING CABLE

(71) Applicant: SYNTONY, Toulouse (FR)

(72) Inventors: Cyrille Gernot, Ste Foy De Peyrolieres (FR); Florence Gernot, Ste Foy De Peyrolieres (FR); Benjamin Patout, Toulouse (FR)

(73) Assignee: SYNTONY, Toulouse (FR)

( * ) Notice: Subject to any disclaimer, the term of this patent is extended or adjusted under 35 U.S.C. 154(b) by 271 days.

(21) Appl. No.: 15/972,337

(22) Filed: May 7, 2018

(65) Prior Publication Data

US 2019/0179035 A1    Jun. 13, 2019

(30) Foreign Application Priority Data

Dec. 8, 2017 (FR) .................................. 17 61856

(51) Int. Cl.
| | |
|---|---|
| *G01S 19/50* | (2010.01) |
| *G01S 19/11* | (2010.01) |
| *H01Q 25/00* | (2006.01) |
| *H01Q 13/20* | (2006.01) |
| *G01S 5/14* | (2006.01) |
| *G01S 19/46* | (2010.01) |

(52) U.S. Cl.
CPC ............. *G01S 19/50* (2013.01); *G01S 19/11* (2013.01); *G01S 5/14* (2013.01); *G01S 19/46* (2013.01); *H01Q 13/203* (2013.01); *H01Q 25/00* (2013.01); *H01Q 25/002* (2013.01)

(58) Field of Classification Search
CPC .......... G01S 19/50; G01S 19/11; G01S 19/09; G01S 19/20; G01S 19/40; G01S 19/46
USPC ....................................................... 342/357.33
See application file for complete search history.

(56) References Cited

U.S. PATENT DOCUMENTS

| | | | |
|---|---|---|---|
| 5,812,086 A | 9/1998 | Bertiger et al. | |
| 6,473,032 B1* | 10/2002 | Trimble | G01S 19/11 342/357.41 |
| 9,596,570 B1* | 3/2017 | Cardoso de Moura | G01S 19/07 |
| 2006/0208946 A1 | 9/2006 | Bailey et al. | |
| 2007/0063893 A1* | 3/2007 | Horton | G01S 19/11 342/357.55 |
| 2013/0099962 A1 | 4/2013 | Katz | |

(Continued)

OTHER PUBLICATIONS

Preliminary French Search Report for French Application No. 1761856, dated Sep. 14, 2018.

(Continued)

*Primary Examiner* — Harry K Liu
(74) *Attorney, Agent, or Firm* — Pearne & Gordon LLP

(57) ABSTRACT

This invention relates to a system and a method of positioning along the length of a cable. The positioning system (100) comprises the radiating cable (110), and also GNSS generator (120) generating the first and second GNSS signals, first injection module (131) to inject the first GNSS signals into a first end of the cable, and second injection module to inject the second GNSS signals into the second end of the cable. The first (second) GNSS signals are defined as signals that would be received at a point located at a first (second) virtual end of the cable, in an open sky configuration, from a first (second) set of satellites visible in a first (second) visibility cone.

10 Claims, 7 Drawing Sheets

(56) References Cited

U.S. PATENT DOCUMENTS

2015/0362598 A1* 12/2015 Rollet .................... G01S 19/15
                                                        701/17
2017/0276799 A1*  9/2017 Martin .................... G01S 19/40
2018/0364364 A1* 12/2018 Orejas ................... G01S 19/254

OTHER PUBLICATIONS

Dr. Cobb, H. Stewart, Pseudolite Concepts for Deep Indoor Navigation, 3rd International Technical Meeting of the Satellite Division of the Institute of Navigation, Sep. 2010, pp. 1-16, Portland Oregon, United States.
Torlotin, T., Control Your Sky, SYNTONY Presentation EU-Japan GNSS Mission, 2017, pp. 1-30, SYNTONY, Tokyo, Japan.

* cited by examiner

POSITIONING SYSTEM WITH MEANS OF GENERATING GNSS SIGNALS AND RADIATING CABLE

TECHNICAL DOMAIN

This invention relates in general to the domain of indoor positioning or outdoor positioning systems when satellite positioning signal reception conditions are degraded.

STATE OF PRIOR ART

The lack of satellite positioning signals called GNSS (Global Navigation Satellite System) signals in indoor environments has led to the development of specific positioning systems for these environments. A large number of possible techniques has been used for this purpose. For example, it is known that networks of beacons can be used in the environment concerned so that a receiver can estimate its position by TDOA (Time Difference Of Arrival) or by triangulation from a TOA (Time Of Arrival). Existing access points can also be used, for example a WiFi network can be used to determine the position of a terminal from fingerprints of power measurements (RSSI). In the special case of the inside of a tunnel, the thesis by F. J. Leite Pereira entitled "Positioning systems for underground tunnel environments" defended at the University of Porto, January 2016, disclosed a positioning system using a radiating cable (leaky feeder) in which the position of a terminal is determined from the power level (RSSI) of a GSM signal previously injected into one end of the cable and received by the terminal. This positioning system has two disadvantages. Firstly, it is relatively imprecise (because it is based on a power measurement), even though this precision can be improved using mapping techniques (RSSI fingerprinting) if the environment has a sufficient range of RSSI levels. Then and more fundamentally, like the other indoor positioning systems mentioned above, it suffers from a major limitation which is that it does not provide a continuous positioning system between the outdoor environment and the indoor environment. In other words, a specific application has to be developed and each user has to download this application onto his or her terminal (usually a smartphone).

To overcome this limitation, the submitting company has designed and marketed a positioning system known as Subwave. Any user with a GPS receiver can use this positioning system for positioning in an indoor environment such as a metro without suffering from a service break when he or she exits from or enters into this environment. The Subwave positioning system uses a radiating cable and makes use of a GNSS signal generator located in the indoor environment and adapted to generate a set of GNSS signals as they would be received at the end of the radiating cable in an open sky configuration. These GNSS signals are synchronised with real GNSS signals received in the outdoor environment. This system is satisfactory in that, due to this synchronisation, it assures operational continuity of positioning between indoor and outdoor environments. However the system cannot be used to position a user along the radiating cable. In other words, a user receiving the GNSS signals from any point along the radiating cable will see his or her position identified as being at the end of the radiating cable.

A first approach to obtain a spatial resolution along the length of the cable would be to adopt the solution recommended in the above-mentioned thesis, namely to deduce the position along the cable making use of the intensity of the received signal. However, this would require the installation of a special application on the user's terminal. Furthermore, the measurement might suffer from errors due to power variations caused by interference, particularly between signals from different sections of the cable.

Another approach would be to break the cable into independent discrete sections, with a GNSS generator in the sense mentioned above being associated with each section and injecting the GNSS signals corresponding to each section. However, this discrete breakdown would increase the number of GNSS generators and therefore the global cost of the system. Furthermore, such a system could cause interference when the sections in question are too close to each other.

Consequently, one purpose of this invention is to disclose a positioning system along the length of at least one radiating cable in an indoor environment (or in an outdoor environment in which reception conditions are degraded), without interrupting service continuity (or with minimum service discontinuity) with an outdoor environment and that guarantees that the user can obtain his or her position along said radiating cable with good precision.

PRESENTATION OF THE INVENTION

This invention is defined by a positioning system along at least one radiating cable, said system comprising the following in addition to said radiating cable:

generating means for generating first and second GNSS signals, the first GNSS signals being defined as signals that would be received at the same instant at a first point (A') in an open sky configuration from a first set ($S_1$) of satellites visible from a first end of the cable in a first visibility cone ($C_1$) around an axis connecting the first and second ends of the cable and along the direction towards the end opposite to the second end, the second GNSS signals being defined as signals that would be received at the same instant at a second point (B') in an open sky configuration from a second set ($S_2$) of satellites visible from the second end of the cable in a second visibility cone ($C_2$) around said axis and along the direction towards the end opposite to the first end, the first and second visibility cones having an empty intersection, said first and second sets of satellites being not empty, the first point being located on said axis, beyond the first end and at a distance $\Delta$ from it along the direction opposite the second end, the second point being located on said axis, beyond the second end and at a distance $\Delta$ from it along the direction opposite the first end, with $$\Delta = \frac{1}{2}\left(\frac{c}{v} - 1\right)l$$

in which l is the length of the radiating cable, v and c are the propagation speeds of electromagnetic waves in the radiating cable and in a vacuum respectively;

first injection means to inject the first GNSS signals into the first end of the radiating cable;

second injection means to inject the second GNSS signals into the second end of the radiating cable;

According to one embodiment, the positioning system also comprises first frequency translation means adapted to translating the second GNSS signals in frequency by a first frequency shift to obtain intermediate GNSS signals, the intermediate signals being injected with the first GNSS signals by the first injection means and propagating from the first end to the second end of the cable, the positioning system also comprising second frequency translation means adapted to translate intermediate GNSS signals by a second frequency shift inverse of the first, so as to regenerate the second GNSS signals and supply them to the second injection means.

Advantageously, the frequency shift is chosen such that the intermediate GNSS signals are outside the radiation band of said cable.

Also advantageously, the frequency shift is chosen such that the intermediate GNSS signals are outside the reception band of a GNSS receiver.

According to a second embodiment, the first GNSS signals propagate from the first end to the second end of the cable without being reflected at said second end and the second GNSS signals propagate from the second end to the first end of the cable without being reflected at the said first end.

The radiating cable may for example be a straight cable.

The half opening angle of the first and second visibility cones can be chosen to be less than 90°, or less than 60° or even less than 30°.

This invention also relates to a method of positioning a receiver along at least one radiating cable, said method including:
- a generating step to generate first and second GNSS signals, the first GNSS signals being defined as signals that would be received at the same instant at a first point, in an open sky configuration, from a first set of satellites visible from a first end of the cable in a first visibility cone around said axis and directed towards the end opposite the first end, the second GNSS signals being defined as signals that would be received at the same instant at a second point in an open sky configuration, from a second set of satellites visible from the second end of the cable in a second cone around said axis and directed towards the end opposite the first end, the first and the second visibility cones having an empty intersection, the first and second sets of satellites not being empty;
- a first injecting step to inject the first GNSS signals into the first end of the radiating cable;
- a second injecting step to inject the second GNSS signals into the second end of the radiating cable.

According to a first embodiment, the positioning method also comprises:
- a first translating step to translate the frequency of the second GNSS signals making use of a first frequency shift to supply intermediate GNSS signals, the intermediate signals being injected with the first signals at the first end and propagating from the first end to the second end of the radiating cable;
- a second translating step to translate the frequency making use of a second frequency shift inverse of the first, so as to regenerate the second GNSS signals before injecting them into the second end of the radiating cable.

Preferably, generation of the first and the second GNSS signals includes:
- configuration of the positioning system using a configuration file, said configuration file including the coordinates of the first and second points, the visibility masks defining the first and second visibility cones, and the constellation of satellites used;
- calculation of orbit parameters of satellites in the constellation identified in the configuration file and selection of the first and second sets of satellites within the identified constellation, starting from the first and second visibility cones;
- calculation of parameters of the first GNSS signals received at the first point from satellites belonging to the first set and second GNSS signals received at the second point from satellites belonging to the second set;
- generation of pseudo-random sequences from satellites belonging to the first and second sets from an external synchronisation clock and generation of navigation messages from these satellites starting from the navigation data;
- generation of first and second GNSS signals by combining pseudo-random sequences with bits of navigation messages, and by modulating at least one carrier by means of the sequences thus combined.

BRIEF DESCRIPTION OF THE DRAWINGS

Other characteristics and advantages of the invention will become clear after reading a preferred embodiment of the invention, given with reference to the appended figures among which.

DETAILED PRESENTATION OF PARTICULAR EMBODIMENTS

In the following, we will consider an environment in which the reception of GNSS signals is degraded or absent, particularly an indoor environment. For the purposes of this description, GNSS (Global Navigation Satellite System) signals refer to any type of satellite signals that can be used for positioning, regardless of the system being considered (GPS, Galileo, GLONASS, Beidou, etc.). Typical but non-limitative usage cases of this invention include for example infrastructures or buildings containing linear zones, such as metros, tunnels or mines.

It will be assumed that a radiating cable is located in the environment in question. A radiating cable (leaky feeder), refers particularly to a coaxial cable in which the external conductor comprises slits or openings at regular intervals to enable a radial emission along its entire length. Any losses along the cable can be compensated by providing as many amplifiers as necessary. In an equivalent manner, it will be possible to use any wave guide with slits or openings with a long dimension along its longitudinal axis allowing radial emission along the entire length of this axis. The radiating cable is not necessarily straight, it can include curved portions as we will see later. However, initially, we will assume that the radiating cable is straight in order to simplify the presentation.

Figure 1:
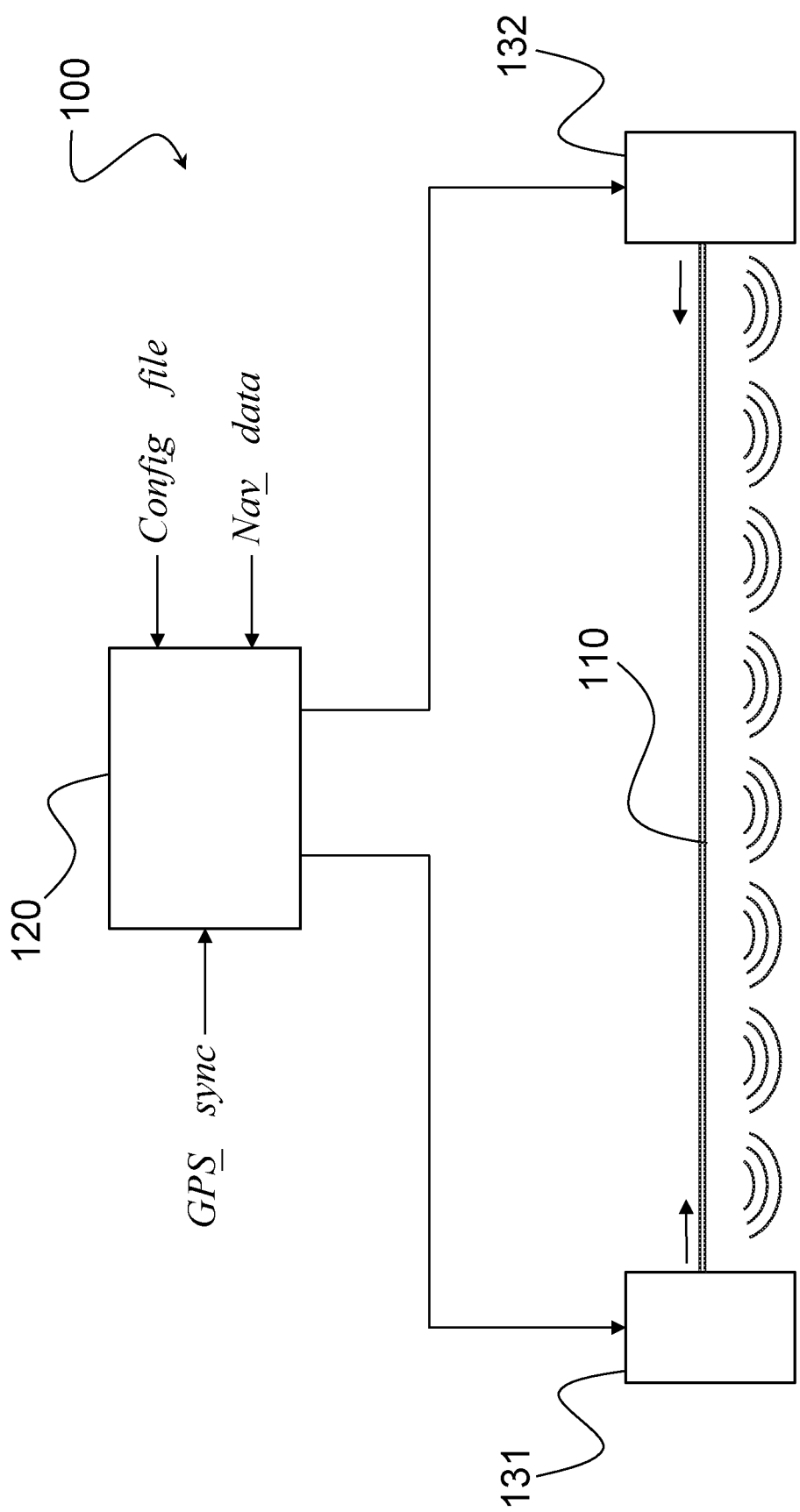
FIG. 1 diagrammatically represents a positioning system along a radiating cable according to a general embodiment of the invention.

FIG. 1 diagrammatically represents a positioning system along the length of a radiating cable according to a general embodiment of the invention;

The system 100 comprises said radiating cable 110, means 120 of generating the first GNSS signals and the second GNSS signals, means of injecting the first GNSS signals into a first end of the cable 131, and means of injecting the second GNSS signals into a second end of the cable 132.

The generation means receive a configuration file Config_file, navigation data Nav_data, and data from a clock with very low jitter GPS_sync, as input.

The configuration file can be downloaded from a server or it can be input using an HMI interface. In particular, the configuration file Config_file can include:
- a visibility mask for each end of the cable, defined by an angular elevation range $[\alpha_{min},\alpha_{max}]$ and possibly an azimuth range $[\beta_{min},\beta_{max}]$, these angular ranges possibly being different at the two ends;
- the corresponding positions of the cable ends;
- the physical characteristics of the cable, namely its length, the propagation velocity of electromagnetic waves in the cable (or equivalently the dielectric constant of the insulation between the internal conductor and the external conductor);
- if possible, the identification of the satellite constellation(s) used.

Instead of the positions of the ends of the cable and the above-mentioned physical characteristics, the position of the virtual ends of the cable can be provided directly, as defined below.

Finally, when the generator is at a distance from the ends of the cable, the configuration file can contain clock offsets corresponding to the propagation times of the first and second signals, at the first end and the second end of the cable respectively, so as to compensate for them during the generation step.

The navigation data Nav_data comprise in particular ephemeris parameters, almanac data, propagation conditions in the ionosphere and clock correction data for the different satellites. These navigation data can be supplied either by a remote GNSS receiver that will have itself extracted them from the navigation messages that it will have received, or downloaded through Internet.

Finally, the external synchronisation signal GPS_sync can be input through the local network using a Precision Time Protocol (PTP) defined in standard IEEE 1588. Alternatively, the signal GPS_sync can be a clock signal tied to the GNSS time and supplied by a remote GNSS receiver.

The generation means 120 supply the first GNSS signals and the second GNSS signals. It is important to understand that the first and the second GNSS signals are generated locally by simulation of propagation and not real signals received from satellites.

The first GNSS signals are generated such that, at the time at which they are injected into the first end of the cable, they are identical to those received at a virtual first end (defined below), under open sky conditions, from a first set of satellites. The first set of satellites is chosen from among the satellites in the constellation(s) identified in the configuration file belonging to a first visibility cone defined by an angular interval in elevation $[\alpha_{min},\alpha_{max}]$ and an angular interval in azimuth $[\beta_{min},\beta_{max}]$, in this case the angles being defined from an axis in the direction from the second end towards the first end of the cable. The first set of satellites comprises at least one such satellite.

The second generated GNSS signals are such that, at the time at which they are injected into the second end of the cable, they are identical to those that would have been received at the position of a second end (as defined below), under open sky conditions, from a second set of satellites. The second set of satellites is chosen from among the satellites in the constellation identified in the configuration file belonging to a second visibility cone defined by an angular interval in elevation $[\alpha_{min},\alpha_{max}]$ and an angular interval in azimuth $[\beta_{min},\beta_{max}]$, in this case the angles being defined from an axis in the direction from the first end towards the second end of the cable. The second set of satellites comprises at least one such satellite.

Furthermore, the union of the first and second sets of satellites must comprise at least four satellites.

Finally, the lower limit of the first/second visibility cone is chosen such that these cones do not contain any satellites below the horizon due to rejection of such satellites by a conventional receiver. The first and second visibility cones must also be chosen such that their intersection is empty (in other words such that this intersection does not contain a satellite in the constellation identified in the configuration file).

Thus, for a horizontal radiating cable, the lower limit of the first/second visibility cone is such that $\alpha_{min} \geq 0°$, in practice $\alpha_{min} \geq 5°$ or even $\alpha_{min} \geq 10°$. Similarly, the upper limit of the first/second visibility cone is such that $\alpha_{max} < 90°$. It is preferably chosen to be less than 60°, or even 30°.

Figure 2:
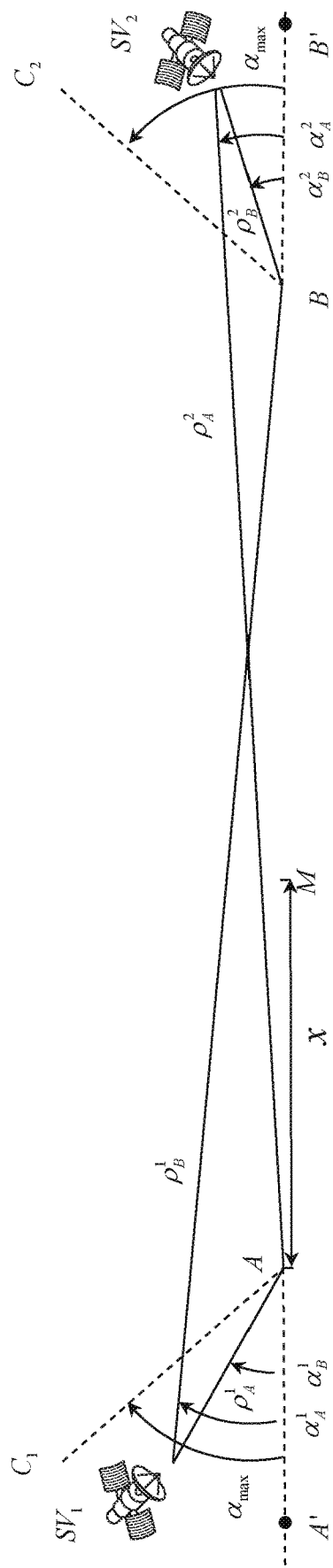
FIG. 2 diagrammatically represents the operating principle of the invention.

FIG. 2 diagrammatically illustrates the operating principle of the invention.

The operating principal was illustrated in this figure in the elevation plane but it is obviously applicable to the general case.

The radiating cable, assumed to be straight, is represented by the straight segment [AB] in which A and B are the ends of the cable. The first and second visibility cones are represented as $C_1$ and $C_2$, with a first satellite $SV_1$ belonging to $C_1$ and a second satellite $SV_2$ belonging to the second visibility cone. The distance separating satellite $SV_1$ (resp. $SV_2$) from the cable ends A and B are denoted $\rho_A^1$ and $\rho_B^1$ (resp. $\rho_A^2$ and $\rho_B^2$). Similarly, the elevation angles at which satellites $SV_1$ (resp. $SV_2$) are seen from cable ends A and B are denoted $\alpha_A^1$ and $\alpha_B^1$ (resp. $\alpha_A^2$ and $\alpha_B^2$). It is assumed herein that $\alpha_{min}=0$.

We will now consider a user equipped with a receiver located at point A, and if $\hat{\rho}_A^2$ is used to denote the pseudo-distance from the receiver to satellite $SV_2$, estimated by the receiver, we obtain:

$$\hat{\rho}_A^2 = \rho_B^2 + L + \delta \quad (1)$$

in which $$L = 1\frac{c}{v}$$

is the apparent length of the cable, l is its real length, c is the speed of light in a vacuum, v is the propagation speed of an electromagnetic wave in the cable and δ is the distance equivalent to the clock offset.

Furthermore, a simple trigonometric relation gives:

$$\rho_A^2 = \frac{1 + \rho_B^2 \cos\alpha_B^2}{\cos\alpha_A^2} \quad (2)$$

If the visibility cone $C_1$ has a small opening angle $\alpha_{max} - \alpha_{min}$ in elevation, $\cos\alpha_B^2 \approx 1$ and $\cos\alpha_A^2 \approx 1$, we have:

$$\rho_A^2 \approx 1 + \rho_B^2 \quad (3)$$

hence:

$$\hat{\rho}_A^2 - \rho_A^2 = 1 \cdot \left(\frac{c}{v} - 1\right) + \delta \quad (4\text{-}1)$$

and similarly, when the user is located at point B, $\rho_B^1 \approx 1 + \rho_A^1$ and:

$$\hat{\rho}_B^1 - \rho_B^1 = 1 \cdot \left(\frac{c}{v} - 1\right) + \delta \quad (4\text{-}2)$$

If we now consider a user located at a point M with abscissa x located on axis AB assuming A as the origin, we have:

$$\hat{\rho}_M^1 - \rho_M^1 = x \cdot \left(\frac{c}{v} - 1\right) + \delta \quad (5\text{-}1)$$

$$\hat{\rho}_M^2 - \rho_M^2 = (1-x) \cdot \left(\frac{c}{v} - 1\right) + \delta \quad (5\text{-}2)$$

or by changing the scale $$X = x \frac{c}{v} \text{ and } L = 1 \frac{c}{v}:$$

$$\hat{\rho}_M^1 = \rho_A^1 + x + x \cdot \left(\frac{c}{v} - 1\right) + \delta = \rho_A^1 + X + \delta \quad (6\text{-}1)$$

$$\hat{\rho}_M^2 = \rho_B^2 + (1-x) \cdot \left(\frac{c}{v}\right) + \delta = \rho_B^2 + (L - X) + \delta \quad (6\text{-}2)$$

In order to eliminate the difference in the propagation speed in free space and in the cable, the signal that would have been received from satellite $SV_2$ is injected into the cable end B at a virtual end B' located on a virtual prolongation of the cable, on the side of end B at a distance $\Delta_B$ from this end. Similarly, the signal that would have been received from satellite $SV_1$ is injected into the cable end A at a virtual end A' located on a virtual prolongation of the cable, on the side of end A at a distance $\Delta_A$ from this end. The distances $\Delta_A$ and $\Delta_B$ are chosen such that $$\Delta_A = \Delta_B = \Delta = \frac{L-1}{2}.$$

In this case, equations (6-1) and (6-2) become:

$$\hat{\rho}_M^1 - \rho_M^1 = \left(x - \frac{1}{2}\right)\left(\frac{c}{v} - 1\right) + \delta \quad (7\text{-}1)$$

$$\hat{\rho}_M^2 - \rho_M^2 = \left(\frac{1}{2} - x\right) \cdot \left(\frac{c}{v} - 1\right) + \delta \quad (7\text{-}2)$$

namely, by changing the scale:

$$\hat{\rho}_M^1 = \rho_A^1 - \frac{L-1}{2} + X + \delta = \rho_{A'}^1 + X + \delta \quad (8\text{-}1)$$

$$\hat{\rho}_M^2 = \rho_B^2 + \frac{L+1}{2} - X + \delta = \rho_{A'}^2 - X + \delta \quad (8\text{-}2)$$

Different embodiments of the receiver can be envisaged.

In a first embodiment, the receiver does not have an application layer above the GPS layer. The calculation of the position made by the receiver is then identical to an outdoor position calculation (that then requires at least four satellites). This calculation will provide an estimate of the position X of the point M along the cable by elimination of the offset δ between the pseudo-distances. This estimate is exact when the point M is located at the mid-point (x=1/2, see equations (7-1) and (7-2)). The error increases symmetrically to reach an absolute value of $$\frac{L-1}{2}$$

at the ends of the cable.

In a second embodiment, the receiver has an application layer above the GPS layer, making the conversion $$x = \frac{v}{c} \cdot X.$$

In this embodiment, the receiver knows the propagation speed in the cable and the end positions of the cable (or its virtual ends).

It will be noted that if the first set and/or the second set of selected satellites contain(s) more than one satellite, the precision of the position is improved due to redundancy of the measurements.

Furthermore, regardless of the embodiment, when the union of the first and the second sets contains at least four satellites, the receiver can determine its position exactly provided that it is in the immediate vicinity of the radiating cable.

Note that when point M is not located in the immediate vicinity of the radiating cable, the position determined by the receiver from the first and second GNSS signals corresponds to the projection of this point on the cable in question. The radial propagation trajectory between the cable and the receiver is common to the first and the second GNSS signals. Therefore it cannot make a spatial discrimination on the radial trajectory: the propagation time between the cable and the receiver is considered as a common offset and is eliminated as a receiver clock offset in the position calculation.

Figure 3:
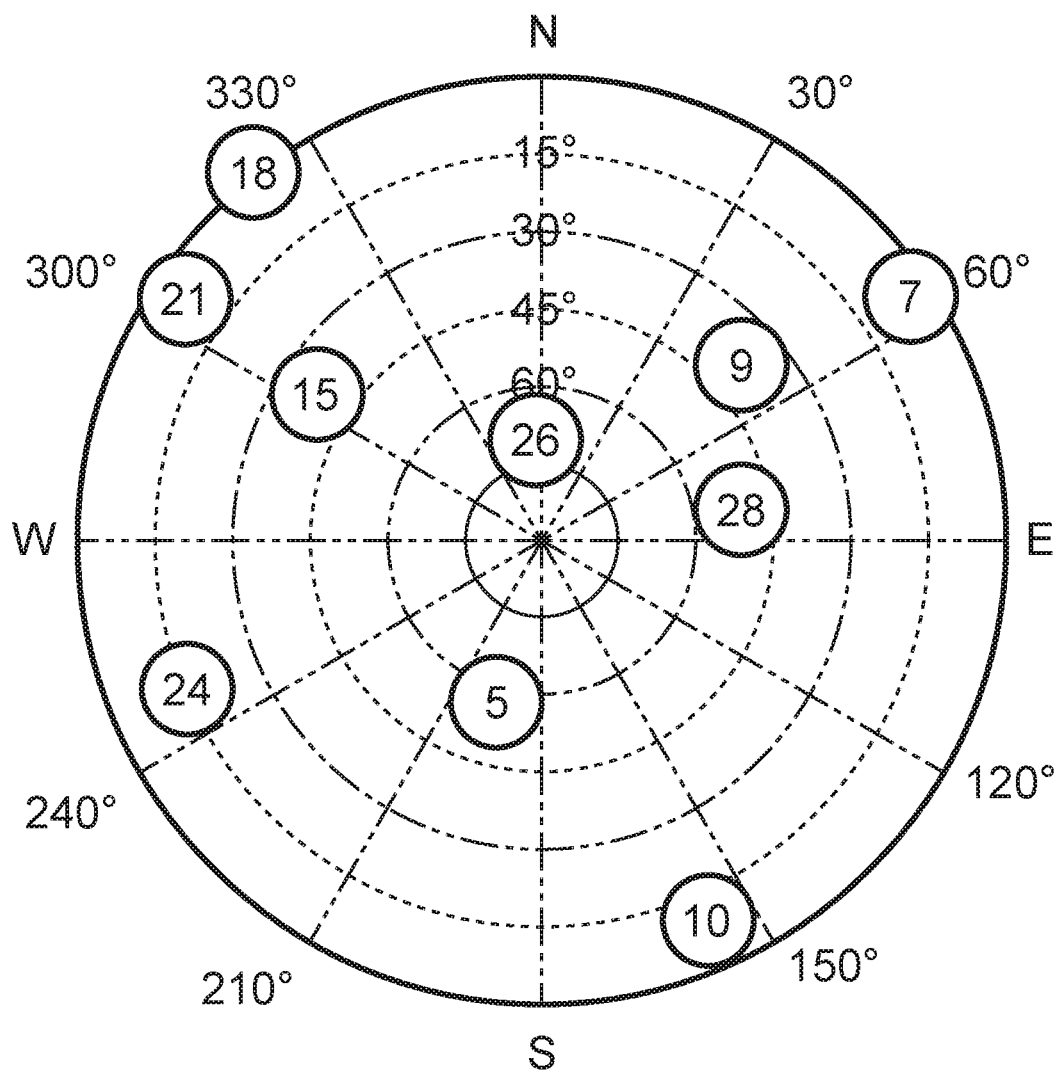
FIG. 3 represents an example of a selection of satellites to generate GNSS signals in the system in FIG. 1.

FIG. 3 illustrates an example of a selection of satellites to generate GNSS signals in the generation means in FIG. 1.

In this example, only one satellite constellation is shown. Satellites are identified by the pseudo-random sequence numbers that they generate.

The direction in the plane of the figure gives the azimuth angle, the north (N) at the top of the figure corresponding to the 0° azimuth and the angle being measured in degrees in the clockwise direction from this origin. The outside circle corresponds to a 0° degree of elevation and therefore a satellite located on the horizon. The central point corresponds to an elevation of 90° and therefore a satellite at the zenith.

Now assuming that the radiating cable is oriented in the east-west direction with end A in the west and end B in the east, the first set of satellites can be composed of satellite numbers 15, 21, 24. Similarly, the second set of satellites can be composed of satellite numbers 28 and 7.

Figure 4:
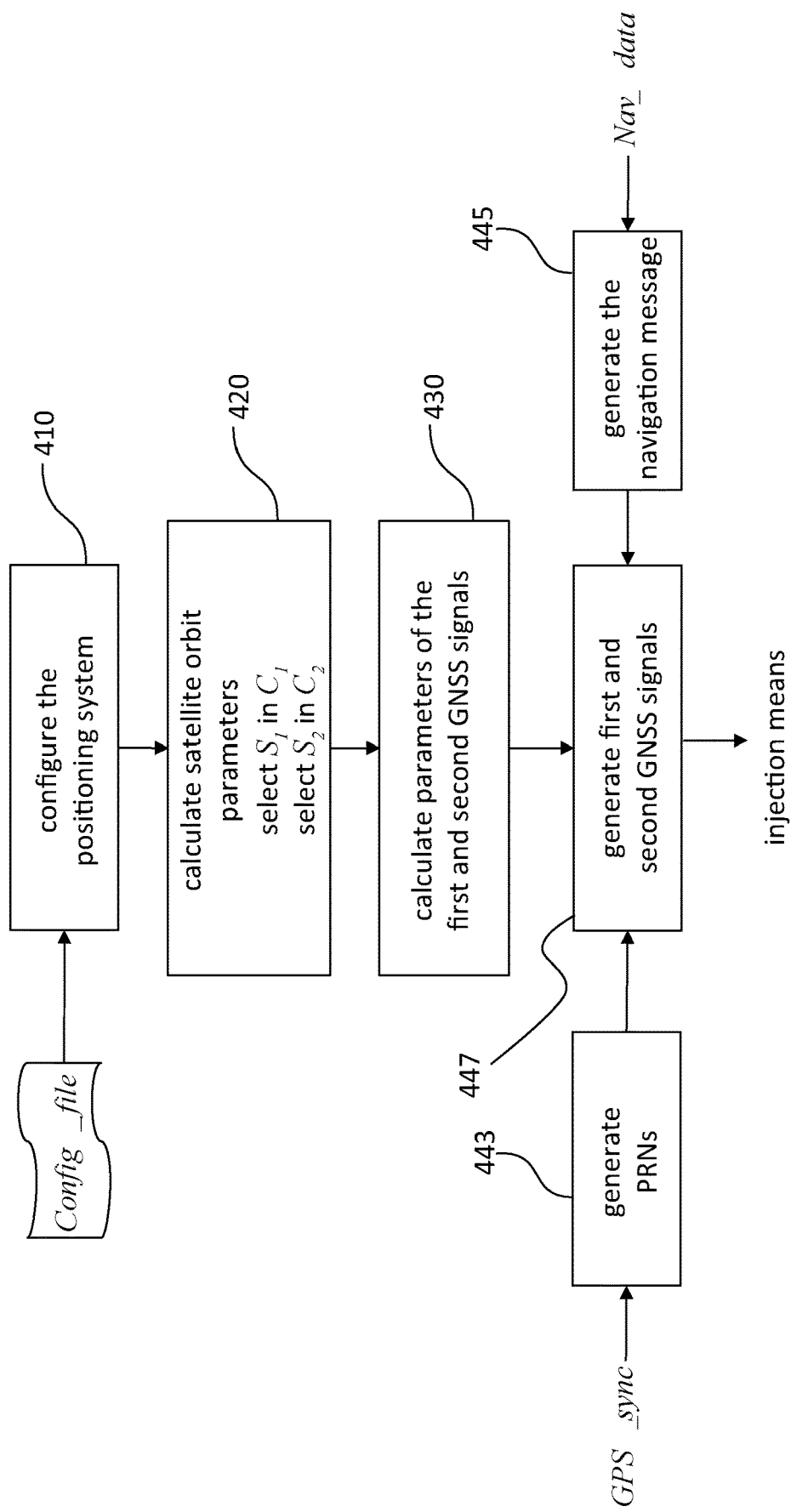
FIG. 4 diagrammatically represents the method of generating first and second GNSS signals in the generation means in FIG. 1.

FIG. 4 diagrammatically illustrates the method of generating first and second GNSS signals by the generation means in FIG. 1.

In step 410, the generation means recover the configuration file, either by an input using the HMI interface or by downloading the file from a remote server. The configuration file configures the positioning system as described above.

In step 420, the generation means calculate the orbit parameters of the satellites identified in the configuration file and deduce the corresponding positions and speeds of the satellites. The generation means then select a first set (not empty) of satellites belonging to the first visibility cone and a second set (not empty) of satellites belonging to the second visibility cone.

In step 430, the generation means determine the parameters of the first and second GNSS signals related to the first set and the second set respectively of satellites. The parameters of the first GNSS signals include particularly the intensity of the signals that would be received at the first injection point of satellites in the first set, the frequency of these signals, the Doppler shifts of these signals (due to the displacement speeds of the satellites relative to the injection point), the shifts of these signals in time representing the propagation times between said satellites and the virtual ends, taking account of corresponding satellite clock errors. The parameters of the second GNSS signals are determined in a similar manner.

Finally, in step 447, the generation means generate the real first and second GNSS signals.

To do this, in 443, the pseudo-random sequences (PRN) of the satellites belonging to the first and second sets are firstly generated by adjusting to the synchronisation signal GPS_sync and taking account of the satellite-receiver path time and satellite clock errors and shifts associated with the generation distance to the end of the cable.

These PRN sequences are combined in 445 with bits of navigation messages, the navigation messages themselves being constructed from data Nav_data from satellites in the first and second sets, emitted synchronously with the PRN sequences. The data Nav_data are downloaded from a server through Internet or are received from a remote GNSS receiver.

The PRN sequences from the different satellites, combined with bits of navigation messages, modulate the carriers (for example L1, L2) to generate the GNSS signals, in a manner known as such.

Thus for example, in the case of a GPS signal, the signal on channel I of carrier L1, corresponding to the C/A code is obtained by:

$$s_{C/A}(t) = \sqrt{P_{C/A}(t)}(d_{C/A}(t-\tau_{C/A}) \oplus c_{C/A}(t-\tau_{C/A})) \cdot \cos(2\pi(f_{L1}+f_{Dop})t + \Phi_{C/A}) \quad (9)$$

in which $P_{C/A}(t)$ is the power on channel I that would be received at the injection point, $\tau_{C/A}$ is the delay of the PRN code, $d_{C/A}(t-\tau_{C/A})$ is the navigation message bit, $c_{C/A}(t-\tau_{C/A})$ is the chip of the PRN code, $f_{L1}$ is the frequency of carrier L1, $f_{Dop}$ is the Doppler shift that affects it taking account of the satellite/injection point speed and $\Phi_{C/A}$ is the phase of the carrier at the moment at which the signal is received by the injection point.

Signal L1 P(Y) on quadrature channel of carrier L1, and L2 P(Y) on carrier L2, are generated similarly.

Similarly, other GNSS signals can be generated for other constellations, in a manner known to the man skilled in the art.

The GNSS signals generated in step 447 are then supplied to the injection modules 131-132.

Figure 5A:
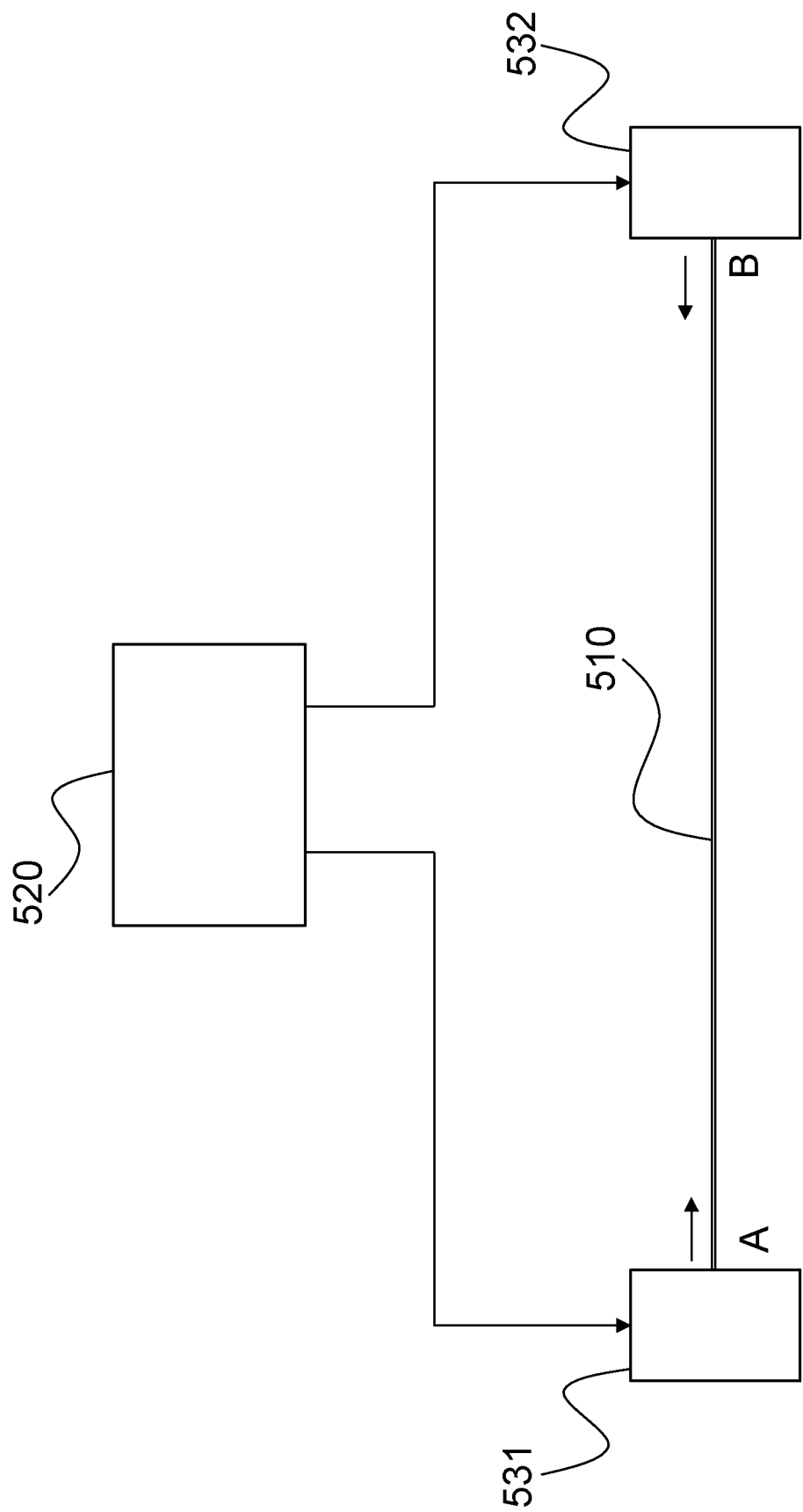
FIG. 5A diagrammatically represents a positioning system along a radiating cable according to a first particular embodiment of the invention.

FIG. 5A diagrammatically represents a positioning system along a radiating cable according to a first particular embodiment of the invention.

In this embodiment, the generation means 520 supply the first GNSS signals to the first injection means 531 located at a first end A of the radiating cable 520 and the second GNSS signals to the second injection means 532 at a second end B of the radiating cable. The first GNSS signals are injected at point A, they propagate from A to B and are emitted radially by the radiating cable along its entire length. Similarly, the second GNSS signals are injected at point B, they propagate from B to A and are emitted radially by the radiating cable along its entire length. Preferably, the first (and second) injection means comprise a directional coupler, the input of which is connected to the generation means, the first output is connected to the end of the coaxial cable, and the second output is closed on a matched load (characteristic impedance of the cable). Multiple reflections of GNSS signals at the ends of the radiating cable are therefore avoided. If applicable, if the radiating cable is very long, a two-directional amplifier could be provided at the mid-point of the cable to compensate for the radiation losses.

Figure 5B:
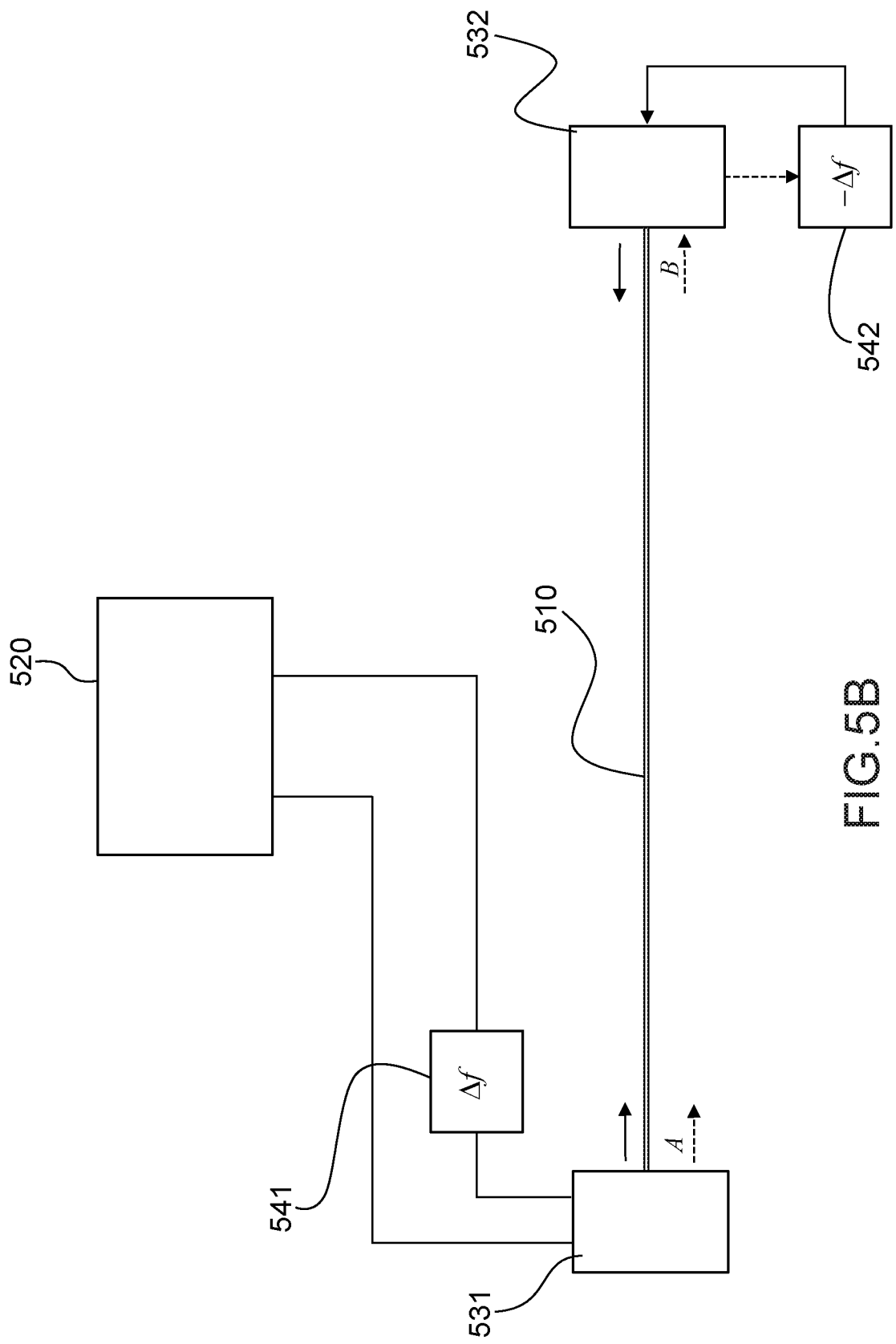
FIG. 5B diagrammatically represents a positioning system along a radiating cable according to a second particular embodiment of the invention.

FIG. 5B diagrammatically represents a positioning system along the length of a cable according to a second particular embodiment of the invention;

In this second embodiment, the second GNSS signals output by the generation means are shifted in frequency by Δf in a first frequency translation module 541, to obtain intermediate GNSS signals. Equivalently, the frequency of the second GNSS signals will be shifted in frequency at the time of their generation (step 447, FIG. 4). The first injection means then inject the intermediate GNSS signals into the radiating cable, in addition to the first GNSS signals.

The frequency shift Δf is chosen such that the intermediate GNSS signals are outside the band of the GNSS receiver. Preferably, the spectral band of the intermediate GNSS signals is located beyond the cutoff frequency of the slits, so as to limit radiation losses during propagation towards the second end.

At the second end, an inverse frequency shift −Δf is applied to the intermediate signals in a second frequency translation module 542 so as to regenerate the second GNSS signals. These second signals thus translated into the initial band are then reinjected into the second end B of the radiating cable to propagate towards the first end. The first signals are also shifted in frequency by −Δf and when they return, are outside the reception band and even the radiation band of the slits.

A man skilled in the art will realise that the second embodiment is advantageous in that the radiating cable itself is used to route GNSS signals at the far end. Furthermore, in some cases, the radiating cable can also be used to carry a DC voltage to supply power to the frequency translation module 542. Therefore there will be no need to provide a power supply at both ends of the radiating cable.

It will be noted that in the second embodiment, as in the first, the effective injection point of the second GNSS signals is located at the second end of the cable, injection at the first end only taking place for the first GNSS signals and the intermediate GNSS signals.

Regardless of the embodiment, the phase of the injected signals can be used to refine the precision of the estimated position, as in a conventional GNSS receiver.

Figure 6:
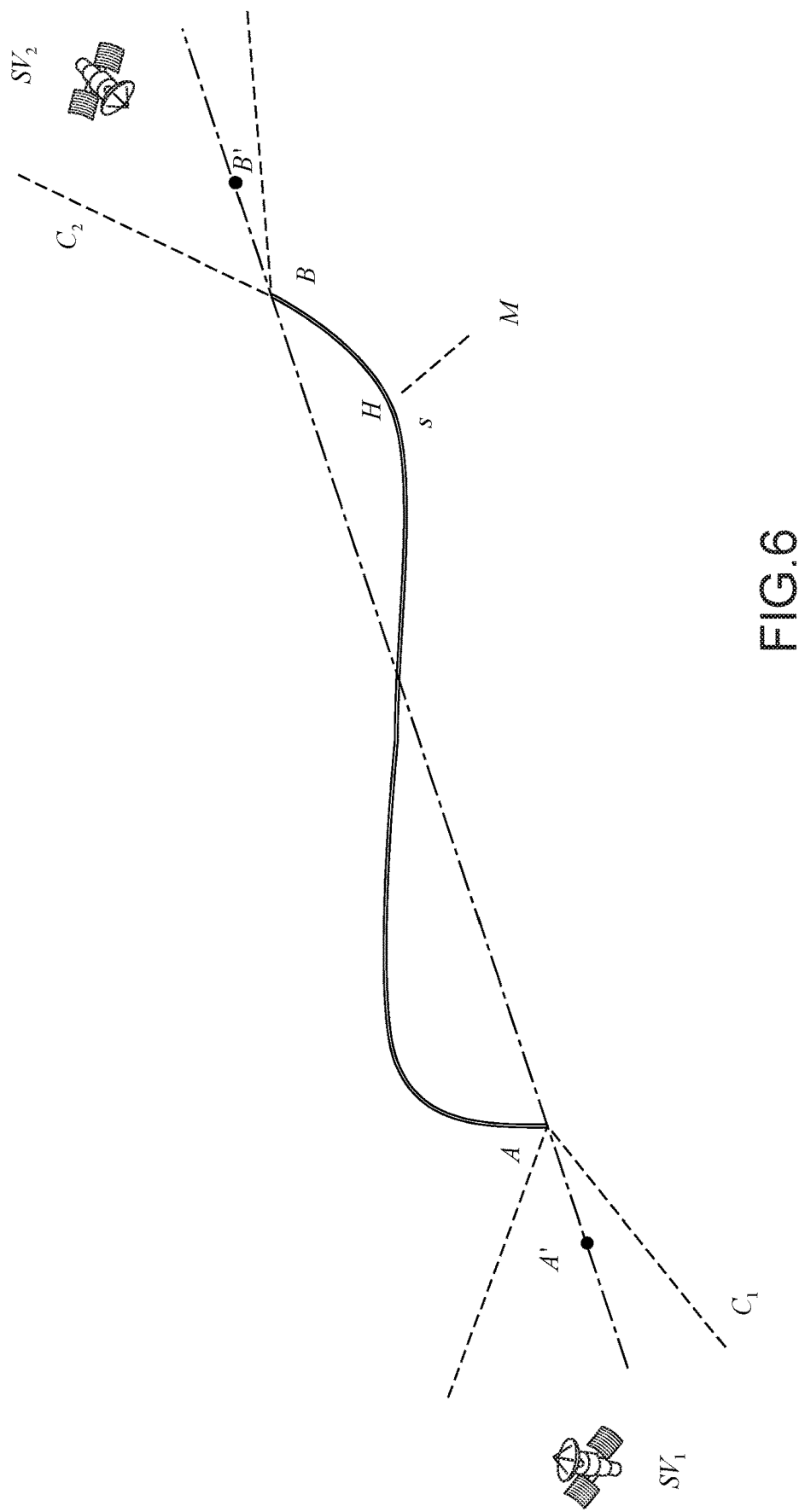
FIG. 6 diagrammatically represents application of this invention to a radiating cable that is not straight.

Up to now, it has been assumed that the radiating cable is straight. However, an expert in the subject will understand that the invention can also be applied to any shape of radiating cable, as shown in FIG. 6.

In the same way as before, the first GNSS signals are injected at a first end of the radiating cable and the second GNSS signals are injected at the second end of the radiating cable. The first GNSS signals are the signals that would be picked up by a virtual first end of the cable, A', in a visibility cone around an axis connecting the two ends A and B and in a direction towards the side opposite to B. As in the case of a straight cable, the virtual first end A' is located on the axis AB, beyond point A in the direction opposite to B and at a distance $\Delta$ from this point. Similarly, the second GNSS signals are the signals that would be picked up by a virtual second end of the cable, B', in a visibility cone around an axis connecting the two ends A and B and in a direction towards the side opposite to A. The virtual second end B' is located on the axis AB, beyond point B in the direction opposite to A and at a distance $\Delta$ from this point.

The visibility cones are chosen such that their intersection is empty, to enable spatial discrimination along the cable.

The position estimated by the GNSS receiver then corresponds to the projection H of the point M at which the GNSS receiver is located onto the curve formed by the cable. More precisely, the receiver can determine the curved abscissa from H using expressions (8-1), (8-2), starting from the pseudo-distances $\hat{\rho}_M^1$ and $\hat{\rho}_M^2$, replacing $$X = \frac{c}{v} x$$

by $$S = \frac{c}{v} s$$

in which s is the curved abscissa of H. If the receiver has a description of the curve, it can determine its position. However, the description of the curve cannot be used without introducing an additional layer capable of relating the curved abscissa to the position of the receiver in space.

One special case consists of a radiating cable in the form of an open circle, to inject the first GNSS signals at a first end propagating in the clockwise direction, and the GNSS signals at a second end propagating in the anticlockwise direction.

Finally, the positioning system according to the invention may comprise a plurality of radiating cables, oriented along non-coplanar and advantageously orthogonal axes (for a resolution in space) and non-parallel, advantageously orthogonal axes (for a resolution in a plane). Each radiating cable is associated with first GNSS signals injected at its first end and second GNSS signals injected at its second end, the first (and second) GNSS signals associated with a cable being the signals that would have been obtained at its first (and second) end in an open sky situation. This system can determine the position of the receiver along several non-coplanar axes (at least three) and use it to determine its position in space

The invention claimed is:

1. Positioning system along the length at least one radiating cable, said system (100) being characterised in that it comprises the following in addition to said radiating cable (110, 510):
   generating means (120, 520) for generating first and second GNSS signals, the first GNSS signals being defined as signals that would be received at the same instant at a first point (A') in an open sky configuration from a first set ($S_1$) of satellites visible from a first end of the cable in a first visibility cone ($C_1$) around an axis connecting the first and second ends of the cable and along the direction towards the end opposite to the second end, the second GNSS signals being defined as signals that would be received at the same instant at a second point (B') in an open sky configuration from a second set ($S_2$) of satellites visible from the second end of the cable in a second visibility cone ($C_2$) around said axis and along the direction towards the end opposite to the first end, the first and second visibility cones having an empty intersection, said first and second sets of satellites being not empty, the first point being located on said axis, beyond the first end and at a distance $\Delta$ from it along the direction opposite the second end, the second point being located on said axis, beyond the second end and at a distance $\Delta$ from it along the direction opposite the first end, with $$\Delta = \frac{1}{2}\left(\frac{c}{v} - 1\right)l$$

in which l is the length of the radiating cable, v and c are the propagation speeds of electromagnetic waves in the radiating cable and in a vacuum respectively;
   first injection means (531) to inject the first GNSS signals into the first end of the radiating cable;
   second injection means (532) to inject the second GNSS signals into the second end of the radiating cable.

2. Positioning system along at least one radiating cable according to claim 1, characterised in that it also comprises first frequency translation means (541) adapted to translating the second GNSS signals in frequency by a first frequency shift to obtain intermediate GNSS signals, the intermediate signals being injected with the first GNSS signals by the first injection means and propagating from the first end to the second end of the cable, the positioning system also comprising second frequency translation means (542) adapted to translate intermediate GNSS signals by a second frequency shift inverse of the first, so as to regenerate the second GNSS signals and supply them to the second injection means.

3. Positioning system along at least one cable according to claim 2, characterised in that the frequency shift is chosen such that the intermediate GNSS signals are outside the radiation band of said cable.

4. Positioning system along at least one cable according to claim 2, characterised in that the frequency shift is chosen such that the intermediate GNSS signals are outside the reception band of a GNSS receiver.

5. Positioning system along at least one radiating cable according to claim 1, characterised in that the first GNSS signals propagate from the first end to the second end of the cable without being reflected at said second end and in that the second GNSS signals propagate from the second end to the first end of the cable without being reflected at the said first end.

6. Positioning system along at least one radiating cable according to claim 1, characterised in that the radiating cable is straight.

7. Positioning system along at least one radiating cable according to claim 6, characterised in that the half opening angle of the first and second visibility cones is less than 90°, or less than 60° or even less than 30°.

8. Method of positioning a receiver along the length of at least one radiating cable, said method being characterised in that it comprises:
- a generating step to generate first and second GNSS signals, the first GNSS signals being defined as signals that would be received at the same instant at a first point, in an open sky configuration, from a first set of satellites visible from a first end of the cable in a first visibility cone around said axis and directed towards the end opposite the first end, the second GNSS signals being defined as signals that would be received at the same instant at a second point in an open sky configuration, from a second set of satellites visible from the second end of the cable in a second visibility cone around said axis and directed towards the end opposite the first end, the first and the second visibility cones having an empty intersection, the first and second sets of satellites not being empty;
- a first injecting step to inject the first GNSS signals into the first end of the radiating cable;
- a second injecting step to inject the second GNSS signals into the second end of the radiating cable.

9. Method of positioning along the length of at least one radiating cable according to claim 8, characterised in that it also comprises:
- a first translating step to translate the frequency of the second GNSS signals making use of a first frequency shift to supply intermediate GNSS signals, the intermediate signals being injected with the first signals at the first end and propagating from the first end to the second end of the radiating cable;
- a second translating step to translate the frequency making use of a second frequency shift inverse of the first, so as to regenerate the second GNSS signals before injecting them into the second end of the radiating cable.

10. Method of positioning along the length of at least one radiating cable according to claim 8, characterised in that generation of the first and second GNSS signals comprises:
- configuration (410) of the positioning system using a configuration file, said configuration file including the coordinates of the first and second points, the visibility masks defining the first and second visibility cones, and the constellation of satellites used;
- calculation (420) of orbit parameters of satellites in the constellation identified in the configuration file and selection of the first and second sets of satellites within the identified constellation, starting from the first and second visibility cones;
- calculation (430) of parameters of the first GNSS signals received at the first point from satellites belonging to the first set and second GNSS signals received at the second point from satellites belonging to the second set;
- generation (443) of pseudo-random sequences from satellites belonging to the first and second sets from an external synchronisation clock and generation (445) of navigation messages from these satellites starting from the navigation data;
- generation (447) of first and second GNSS signals by combining pseudo-random sequences with bits of navigation messages, and by modulating at least one carrier by means of the sequences thus combined.

* * * * *